2,901,355
FOOD PRODUCT

James G. Bangert, Fairview, N.J., and Arthur Feldman, Monsey, N.Y., assignors to General Foods Corporation, White Plains, N.Y., a corporation of Delaware No Drawing. Application September 23, 1957
Serial No. 685,403

4 Claims. (Cl. 99—139)

This invention relates to the preparation of an instant pudding, and more particularly to a compostion which when combined with cold milk will, within a relatively short period of time, result in a pudding having characteristics similar to those of a cooked starch pudding.

Instant pudding mixes are being marketed today which employ a pulverulent thickening agent (pre-gelatinized starch) in combination with phosphate gelling systems which serve to gel milk added to the mix. One such phosphate milk gelling system is fully described in U.S. Patent No. 2,801,924 to Clausi et al., August 6, 1957; this system employs an alkali pyrophosphate such as a tetra-alkali pyrophosphate as a coagulant and an alkali orthophosphate as a coagulation accelerator. Another phosphate mix presently on the market is that described in U.S. Patent No. 2,607,692 to Kennedy et al., August 19, 1952; this system employs a tetra-alkali pyrophosphate as the coagulant with a soluble calcium salt as a coagulation accelerator. In such desserts the phosphates serve to rapidly gel the milk protein while the pre-gelatinized starch or other stiffening agent serves to hydrate rapidly and thereby thicken the delicate gel system so that in a matter of minutes it assumes a texture approaching that of a cooked starch pudding.

In the preparation of the dessert the housewife is likely to employ rapid mechanical agitation in hydrating the dry mix ingredients with the milk. The housewife usually chooses to employ cold milk in preparing the instant pudding and it is quite often the case that the mix solution foams during whipping. As a result of the rapid onset of gelation this foaming produces an unattractive pebbly surface on the dessert; in addition, the texture of the dessert product assumes a somewhat aerated condition less like that of a cooked starch pudding. Hence, for many dessert users this aerated dessert texture is less appealing to the palate.

Heretofore, in the compounding of instant pudding mixes an edible oil has been incorporated into the dry mix ingredients during formulation. This practice serves two purposes. In the first place, it eliminates a "dusting" problem which would otherwise stem from the pulverulent character of the dry mix ingredients such as pre-gelatinized starch are likely to become air-veyed and hence lost during the process of compounding the mix and filling the packages therefore. By preventing dusting, the edible oil offers greater opportunity to maintain the proportions of mix ingredients within mass production tolerances. Such dampening of the pulverulent character of the pre-gelatinized starch, for example, avoids the loss of starch and hence insures against pudding mixes having a weak gel.

An edible oil such as coconut oil does in part also reduce the foaming tendency of the instant pudding mix solution. However, such oils are effective only when certain manufacturing and recipe conditions are adhered to. For example, in the case of the coconut oil the mix temperature should be maintained at a temperature substantially above the melting point of the oil (about 75° F.); otherwise, although the housewife may employ relatively gentle agitation in hydrating the mix and use only moderately chilled milk (52°–58° F.) the pudding is likely to have a rough surface and a non-uniform texture, the bottom of the pudding being very thin and watery and the eventual pudding suffering from relatively rapid syneresis and non-uniform consistency. Clearly cautioning the housewife to maintain the pudding mix at a temperature above 75° F. is impractical since this temperature is above normal room temperature.

Even when a higher melting point fat is employed in the mix considerable foaming will result upon hydrating it rapidly (whipping) with milk which has been stored in a kitchen refrigerator having a temperature of 45° F. and lower; this occurrence is accentuated when cold skim milk is employed to hydrate the mix. Such refrigerated milk temperatures are not uncommon and indeed are usually the case in the household where the milk temperatures commonly range from 35°–45° F. As a result of such foaming, the pudding sets with the aforementioned undesirable texture.

It is among the objects of the present invention to provide a dry instant pudding mix of the foregoing character which is free of dusting but which at the same time offers considerable latitude in manufacturing control as well as in tolerance to various culinary practices in the household and elsewhere where refrigerated as well as only moderately chilled milk is employed to hydrate the pudding mix and where the pudding mix temperature can vary.

Moreover, though the edible oil must be maintained above its melting point pust prior to introduction into the dry instant pudding mix ingredients, there is always the likelihood due to oversights in manufacturing quality control that the melting point of the oil will be elevated to too high a temperature thereby destroying the usefulness of either its inherent or added antioxidants and producing a mix which eventually suffers from a rancid odor in the package.

The discovery of the present invention fulfills all of the foregoing objectives.

The present invention comprises an instant pudding composition having in combination a phosphate milk protein coagulating agent and a coagulation accelerator as well as a pudding stiffening agent; in this combination is incorporated: (a) a dry-to-the-touch, free-flowing, readily dispersible granular shortening in which the fat has emulsifiers dissolved therein; and (b) a winterized edible oil uniformly distributed throughout the composition.

The emulsifier dissolved in the fat of the granular shortening may be any one of a number of partial esters of polyhydroxy compounds and fatty acids such as mono- and di-glycerides and other partial esters of fatty acids and alcohols. Thus, the emulsifier employed is a substance containing a high molecular weight aliphatic lipoliphic group and also free hydroxyl groups; such an emulsifier has heretofore been identified as a hydrophilic lipin; this hydrophilic lipin is capable of emulsifying the other oleaginous constituents in the pudding composition as well as that which may be present in the milk added to prepare a mix solution, these oleaginous constituents being thereby transformed into discrete particles in the mix solution. In order that these emulsifiers will remain stable on storage when incorporated into the above-specified granular material they are dissolved in a fat such as hydrogenated cottonseed oil which serves as a carrier for the emulsifiers and allows them to be converted to the dry-to-the-touch, free-flowing form without subsequent development of rancidity. Preferably this fat phase of the granular shortening is emulsified in non-fatty constituents which promote dispersibility of the oleaginous constituents in the granular shortening upon addition of milk to the pudding mix, such non-fatty constituents serving as encapsulating solids and forming a matrix for the discrete emulsifier-containing fat particles in the granular shortening. Included among those ingredients which will serve as encapsulating solids in the granular shortening are carbohydrates such as sucrose, dextrose, maltose and pre-gelatinized starch, and vegetable and animal gums like gum arabic, gum tragacanth and gelatin, as well as water-soluble proteinaceous solids like skim milk and sodium caseinate which dissolve in milk to release the discrete fat particles and the emulsifiers contained therein upon hydration of the mix.

The hydrophilic lipin emulsifiers used in the granular shortening are generally partial fatty acid esters of water-soluble, hydroxy substances such as glycerols, polyglycerols, sugars, sorbitol, manitol, and other alcohol sugars and hydroxy carboxylic acids. In the absence of such emulsifiers or hydrophilic lipins as they are referred to hereinabove in the granular shortening, the pudding mixes will foam when hydrated with rapid agitation upon the addition of skim milk, whole milk and reconstituted skim milk, even when the mix has incorporated therein the winterized edible oil. Too high a level of hydrophilic lipin in the granular shortening can introduce as a side effect weaker texture and syneresis in the pudding. Accordingly, although it is necessary to employ a certain level of hydrophilic lipin in the granular shortening to obtain the improvements of this invention, the level employed should be such that the foregoing side effects are not encountered. Thus, in the case of mono-glycerides molecularly distilled in a high vacuum still from animal tallow, it has been observed that the level of such emulsifiers should be maintained well below 1% of the total mix ingredients, specifically below 0.05%. In the case of a granular shortening containing 10% of these mono-glycerides by weight of the fat in the granular shortening, no syneresis and weakening of the gel could be observed; at a higher level of emulsifier in the order of 20% by weight of the fat in the granular shortening, although the foregoing aeration problems were eliminated, some syneresis and weakness in the gel could be observed. In accordance with the foregoing relationship of emulsifier to the fat of the oleaginous constituents in the mix, the level of granular shortening used should be maintained below that at which an excess of hydrophilic lipin would be introduced into the pudding.

In the absence of the winterized edible oil a pudding mix composition containing the herein specified granular shortening and the other instant pudding mix ingredients will also experience aeration upon hydration of the mix in cold milk with rapid agitation. Accordingly, the winterized oil should be employed at a sufficient level to repress this tendency toward aeration and, although the oil also serves to prevent dusting during mix manufacture, it acts in combination with the granular shortening to prevent foaming. The winterized edible oil should have a solidification point substantially below the temperature of the coldest milk useable to produce the pudding; e.g., in the order of 35° F.

The winterized edible oil can be of animal or vegetable origin such as, soy bean oil, corn oil, olive oil, peanut oil and cottonseed oil, which can be refined and deodorized and have separated therefrom at temperatures below their normal solidification temperatures fractions insoluble in the oil, such fraction being known as "foots." Unhydrogenated cottonseed oil which has been refined and deodorized and which has removed therefrom non-liquefiable fats at temperatures in the order of 20°–26° F. is an example of such a winterized oil. Generally the winterized edible oil has a high degree of unsaturated fatty acids with either long or short carbon chains; these liquid tri-glycerides isolated after repeated winterizing cycles therefore may require the use of any well known anti-oxidant to offset development of rancidity.

The winterized edible oil can be distributed throughout the dry ingredients of the composition by simply pouring the oil into a batch of sugar and mixing so as to create an oil-coated sugar. Thereafter the oil-coated sugar can be blended with the other dry ingredients of the pudding composition. Instead of blending the oil with the sugar it can be blended with a fraction of the other ingredients of the composition to coat the particles thereof and the oil-coated particles of this fraction can then be blended with the balance of the composition. Preferably the winterized edible oil is not blended or mixed with the pregelatinized starch since the oil coating of the starch particles may impede hydration of the latter.

The milk coagulation agent can take the form of any one of a number of phosphates such as a di-alkali, tri-alkali, or tetra-alkali pyrophosphate; other milk coagulation agents are the alkali tri-polyphosphates such as the sodium salt ($Na_5P_3O_{10}$); the tripoly- and pyrophosphates could also be used in combination as milk coagulation agents. The coagulation acceleration agent employed can be an alkali orthophosphate such as di-sodium di-hydrogen orthophosphate or any one of the other alkali phosphates in this group. Instead of the orthophosphates, water-soluble calcium salts such as calcium acetate can be employed as a coagulation accelerator in combination with the phosphate milk coagulator. It is also possible to employ a number of these coagulation accelerators in combination such as a di-sodium di-hydrogen orthophosphate together with calcium acetate. In connection with the gel stiffening agent, although pre-gelatinized starch is preferred, other thickeners capable of lending substance to the delicate milk gel created by the coagulator and the coagulation accelerator can be employed; such alternative stiffening agents are starch derivatives, natural gums and modifications thereof, cellulose derivatives and the like.

Sucrose and other sugars are preferably employed along with various flavoring and coloring ingredients in the dry mix to suit popular taste.

Specific examples of the composition of the present invention are set forth in the following table and relate to a vanilla and chocolate pudding, respectively.

| Ingredients | Vanilla, gm. | Chocolate, gm. | Vanilla, gm. | Vanilla, gm. |
|---|---|---|---|---|
| Coating Sugar | 66.5 | 65.5 | 66.5 | 66.5 |
| Color | 0.3 | 0.4 | 0.3 | 0.3 |
| Vanilla Flavoring | 2.5 | 1.4 | 2.5 | 2.5 |
| Pre-gelatinized Potato Starch | 20.0 | 26.0 | 20.0 | 20.0 |
| Tetrasodium Pyrophosphate Anhydrous Powdered | 1.5 | 1.5 | | |
| Disodium Dihydrogen Pyrophosphate Anhydrous Powdered | | | 2.0 | |
| Trisodium Hydrogen Pyrophosphate Anhydrous Powdered | | | | 2.0 |
| Disodium Phosphate Anhydrous Powdered | 1.5 | 3.0 | 2.0 | 2.0 |
| Cocoa | | 16.0 | | |
| Granular Shortening | .45 | .45 | .45 | .45 |
| Winterized Cottonseed Oil | .35 | .35 | .35 | .35 |

The winterized cottonseed oil is a non-hydrogenated cottonseed oil with some of the higher melting temperature fractions removed. This oil had an iodine value of 111–113, a solidification temperature (A.S.T.M.) of 20°–26° F. and a cloud point of 24°–26° F. The granular shortening is a spray dried shortening prepared by drying an emulsion of hydrogenated cottonseed oil, non-fat milk solids, sugar and starch; the total fat of this spray dried shortening was 70% by weight and it contained as its emulsifier animal derived mono-glycerides totaling 10% of the fat in the granular shortening.

Any of the dry compositions set forth above are added to one pint of cold milk chilled to a temperature of about 40° F. and distributed throughout the milk by agitation with an egg beater for about one minute. During such agitation the pudding solution is free of aeration. The pudding solution can be poured into individual serving dishes and allowed to set, or (if desired) it may simply be allowed to remain in the bowl. The pudding sets up to a product having a smooth surface and uniform consistency in about five minutes.

The pudding mix composition can be compounded in the plant without any dusting problems and without requiring the use of elevated temperatures. Compounding, therefore, is quite simple and readily controlled.

While the present invention has been described with particular reference to specific examples, it is not to be limited thereby, but reference is to be had to the appended claims for a definition of its scope.

What is claimed is:

1. A composition for use in preparing an instant pudding comprising in combination a phosphate milk protein coagulating agent and a coagulation accelerator; a pudding stiffening agent; a dry-to-the-touch, free-flowing, readily dispersible granular shortening in which the fat has a hydrophilic lipin dissolved therein; and a winterized edible oil distributed throughout the composition, and having a solidification point substantially below the freezing point of milk.

2. A composition for use in preparing an instant pudding comprising in combination a phosphate milk protein coagulating agent and a coagulation accelerator; a pudding stiffening agent; a dry-to-the-touch, free-flowing, readily dispersible granular shortening in which the fat has dissolved therein partial esters of polyhydroxy compounds and fatty acids; and a winterized edible oil distributed throughout the composition, and having a solidification point substantially below the freezing point of milk.

3. A composition for use in preparing an instant pudding comprising in combination an alkali pyrophosphate and a coagulation accelerator; pre-gelatinized starch; a dry-to-the-touch, free-flowing, readily dispersible granular shortening in which the fat has dissolved therein partial esters of polyhydroxy compounds and fatty acids; and a winterized edible oil distributed throughout the composition, and having a solidification point substantially below the freezing point of milk.

4. A composition for use in preparing an instant pudding comprising in combination an alkali pyrophosphate and an alkali orthophosphate; pre-gelatinized starch; a dry-to-the-touch, free-flowing, readily dispersible granular shortening in which the fat has dissolved therein partial esters of polyhydroxy compounds and fatty acids; and a winterized edible oil distributed throughout the composition, and having a solidification point substantially below the freezing point of milk.

References Cited in the file of this patent

UNITED STATES PATENTS

| | | |
|---|---|---|
| 2,109,842 | Harris | Mar. 1, 1938 |
| 2,266,591 | Eckey et al. | Dec. 16, 1941 |
| 2,392,833 | Chapin | Jan. 15, 1946 |
| 2,554,143 | Hinz et al. | May 22, 1951 |
| 2,607,692 | Kennedy et al. | Aug. 19, 1952 |
| 2,801,924 | Clausi | Aug. 6, 1957 |